(12) United States Patent
Hansen et al.

(10) Patent No.: US 10,939,460 B2
(45) Date of Patent: Mar. 2, 2021

(54) METHOD OF SCHEDULING FIELD DEVICES IN A WIRELESS NETWORK OF AN INDUSTRIAL PROCESS SYSTEM

(71) Applicant: ABB Schweiz AG, Baden (CH)

(72) Inventors: Ewa Hansen, Västerås (SE); Johan Åkerberg, Västerås (SE); Jonas Neander, Västerås (SE); Krister Landernäs, Hallstahammar (SE); Niclas Ericsson, Västerås (SE); Tomas Lennvall, Örebro (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/343,203

(22) PCT Filed: Oct. 11, 2017

(86) PCT No.: PCT/EP2017/075883
§ 371 (c)(1),
(2) Date: Apr. 18, 2019

(87) PCT Pub. No.: WO2018/073059
PCT Pub. Date: Apr. 26, 2018

(65) Prior Publication Data
US 2019/0320451 A1 Oct. 17, 2019

(30) Foreign Application Priority Data
Oct. 21, 2016 (EP) ..................... 16194952

(51) Int. Cl.
*H04W 72/12* (2009.01)
*H04W 72/04* (2009.01)
(Continued)

(52) U.S. Cl.
CPC .... *H04W 72/1263* (2013.01); *H04W 72/0446* (2013.01); *H04J 3/02* (2013.01); *H04L 67/12* (2013.01); *H04W 74/0808* (2013.01)

(58) Field of Classification Search
CPC ......... H04W 72/1263; H04W 72/0446; H04W 74/0808; H04W 72/00; H04W 48/08;
(Continued)

(56) References Cited

U.S. PATENT DOCUMENTS

2010/0178926 A1 7/2010 Tanigawa et al.
2010/0272093 A1 10/2010 Raravi et al.
(Continued)

FOREIGN PATENT DOCUMENTS

EP 1763156 A2 3/2007

OTHER PUBLICATIONS

Vogiatzis N. et al: "An adaptive multicarrier wireless access system", Wireless Communications and Networking Confernce, 2000. WCNC. 2000 IEE E Sep. 23, 2000; Piscataway, NJ. vol. 1 pp. 298-303.

(Continued)

*Primary Examiner* — Hardikkumar D Patel
(74) *Attorney, Agent, or Firm* — Whitmyer IP Group LLC

(57) ABSTRACT

A method of scheduling field devices in a wireless network of an industrial process system is provided. The method is performed in a scheduling device and includes scheduling
(Continued)

one or more field devices on uplink resources and on downlink resources, such that, for at least one of the field devices, a periodicity of uplink resources is different than a periodicity of downlink resources.

11 Claims, 3 Drawing Sheets

(51) Int. Cl.
  *H04J 3/02* (2006.01)
  *H04L 29/08* (2006.01)
  *H04W 74/08* (2009.01)
(58) Field of Classification Search
  CPC ..... H04W 72/08; H04W 72/04; H04W 24/10; H04W 72/082; H04W 72/12; H04W 16/14; H04W 72/1284; H04W 72/1289; H04W 72/1268; H04W 72/0453; H04W 72/14; H04W 72/1205; H04W 16/10; H04W 74/08; H04J 3/02; H04L 67/12; H04L 5/00; H04L 5/0073; H04L 1/0026; H04L 5/005; H04L 1/00; H04L 1/18; H04L 1/1854; H04L 1/1887; H04L 1/1806; H04L 1/0007; H04L 5/001; H04L 5/0094; H04L 5/0055; H04L 5/0057; H04L 5/0048; H04L 1/1861; H04L 5/0035; H04L 5/0053; H04L 5/14; H04B 7/26; H04B 7/2656
  See application file for complete search history.

(56) References Cited

U.S. PATENT DOCUMENTS

| | | | |
|---|---|---|---|
| 2011/0105136 A1* | 5/2011 | Choi | H04W 48/08 |
| | | | 455/452.1 |
| 2012/0014369 A1 | 1/2012 | Venkob et al. | |
| 2012/0127971 A1 | 5/2012 | Isaksson | |
| 2014/0092847 A1 | 4/2014 | Akerberg et al. | |
| 2014/0313908 A1 | 10/2014 | da Silva et al. | |
| 2015/0036649 A1* | 2/2015 | Chen | H04B 7/2656 |
| | | | 370/330 |
| 2015/0171956 A1 | 6/2015 | Wang et al. | |
| 2016/0029357 A1 | 1/2016 | Lv et al. | |
| 2019/0116602 A1* | 4/2019 | Zhang | H04L 5/0073 |

OTHER PUBLICATIONS

European Search Report Application No. EP 16 19 4952 Completed: Apr. 13, 2017;dated Apr. 21, 2017 9 pages.
International Preliminary Report on Patentability Application No. PCT/EP2017/075883 dated Sep. 19, 2018 15 pages.
International Search Report and Written Opinion of the International Searching Authority Application No. PCT/EP2017/075883 Completed: Apr. 24, 2018; dated May 2, 2018 15 pages.
Yunjie Zhang et al: "Research of the Network Manager for WIA-PA", Wireless Communications Networking and Mobile Computing (WICOM), 2010 6th International Conference on, IEEE, Piscataway, NJ. Sep. 23, 2010 pp. 1-4.

* cited by examiner

METHOD OF SCHEDULING FIELD DEVICES IN A WIRELESS NETWORK OF AN INDUSTRIAL PROCESS SYSTEM

TECHNICAL FIELD

The technology disclosed herein relates generally to the field of scheduling in wireless networks, and in particular to a method of scheduling field devices in a wireless network of an industrial process system, a scheduling device, computer program and computer program product.

BACKGROUND

Wireless mesh networks may use Time Division Multiple Access (TDMA) or Carrier Sense Multiple Access (CSMA) as mechanism for accessing a shared medium (a wireless spectrum). TDMA divides the medium into time slots and assigns time slots to different devices in which they can communicate. Determining which devices should be assigned which TDMA slot (one or more) for communication is known as scheduling. CSMA scheduling solutions on the other hand are usually distributed (i.e., a node uses only its own information) and are based on the idea that a node can communicate anytime the medium is free.

In wireless networks with nodes sharing the communication resources, it is important that the scheduling is efficient so that the communication resources are used in the best possible way. This is becoming increasingly important as the number of devices increases, e.g., with the introduction of Internet of Things (IoT) wirelessly connecting numerous devices to Internet. IoT scenarios may be foreseen also in industrial process systems and in automation networks.

US 2011/105136 relates to semi-persistent scheduling (SPS). A user equipment (UE) has the same resource block assignments, the same MCS (Modulation and Coding Scheme) etc., until the SPS is inactivated. The control channel resources can thereby be reduced for predictable traffic such as e.g., VoIP (Voice over Internet Protocol).

US 2012/014369 relates to assignment and allocation in a wireless telecommunications system, and in particular to a method for reducing signaling load therein.

Vogiatzis N et al.: "An adaptive multicarrier wireless access system" describes the protocol stack of a broadband wireless access system.

US2010/272093 describes industrial automation control and discloses how the control and automation system can support the use and control of wireless actuators.

SUMMARY

An objective of the present invention is to address and improve various aspects for scheduling in wireless networks, in particular wireless networks in an industrial environment, e.g., in a process control system. A particular objective is to provide flexibility in the scheduling in a wireless network of a process control system. Another particular objective is to increase resource utilization in a wireless network of a process control system. These objectives and others are achieved by the methods, devices, computer programs and computer program products according to the appended independent claims, and by the embodiments according to the dependent claims.

The objective is according to an aspect achieved by a method of scheduling field devices in a wireless network of an industrial process system. The method is performed in a scheduling device and comprises scheduling one or more field devices on uplink resources and on downlink resources, such that, for at least one of the field devices, a periodicity of uplink resources is different than a periodicity of downlink resources.

In contrast to known TDMA scheduling methods, which uses either fixed schedule lengths or have the same period times for both uplink and downlink communication, the method enables the adaptation of resources in view of the need of the particular device. Also in contrast to the known scheduling methods, which are very limited in meeting e.g., specific application requirements of the application(s) that use the wireless network, the present invention provides an increased flexibility when creating schedules by having different uplink/downlink period times. Further, the invention allows different devices and their application requirements to dictate the schedule. Still further, the method provides the possibility to optimize useful network utilization by using individual parameters for up/downlinks (pushing the useful utilization towards 100%), which in turn allows more devices to be part of the network. The latter is an important advantage in view of the increasing number of devices with connectivity, e.g., Internet of Things (IoT) devices.

The objective is according to an aspect achieved by a computer program for a scheduling device. The computer program comprises computer program code, which, when executed on at least one processor on the scheduling device causes the scheduling device to perform the method as above.

The objective is according to an aspect achieved by a computer program product comprising a computer program as above and a computer readable means on which the computer program is stored.

The objective is according to an aspect achieved by a scheduling device for scheduling field devices in a wireless network of an industrial process system. The scheduling device is configured to schedule one or more field devices on uplink resources and on downlink resources, such that, for at least one of the field devices, a periodicity of uplink resources is different than a periodicity of downlink resources.

Further features and advantages of the embodiments of the present teachings will become clear upon reading the following description and the accompanying drawings.

DETAILED DESCRIPTION

Figure 1:
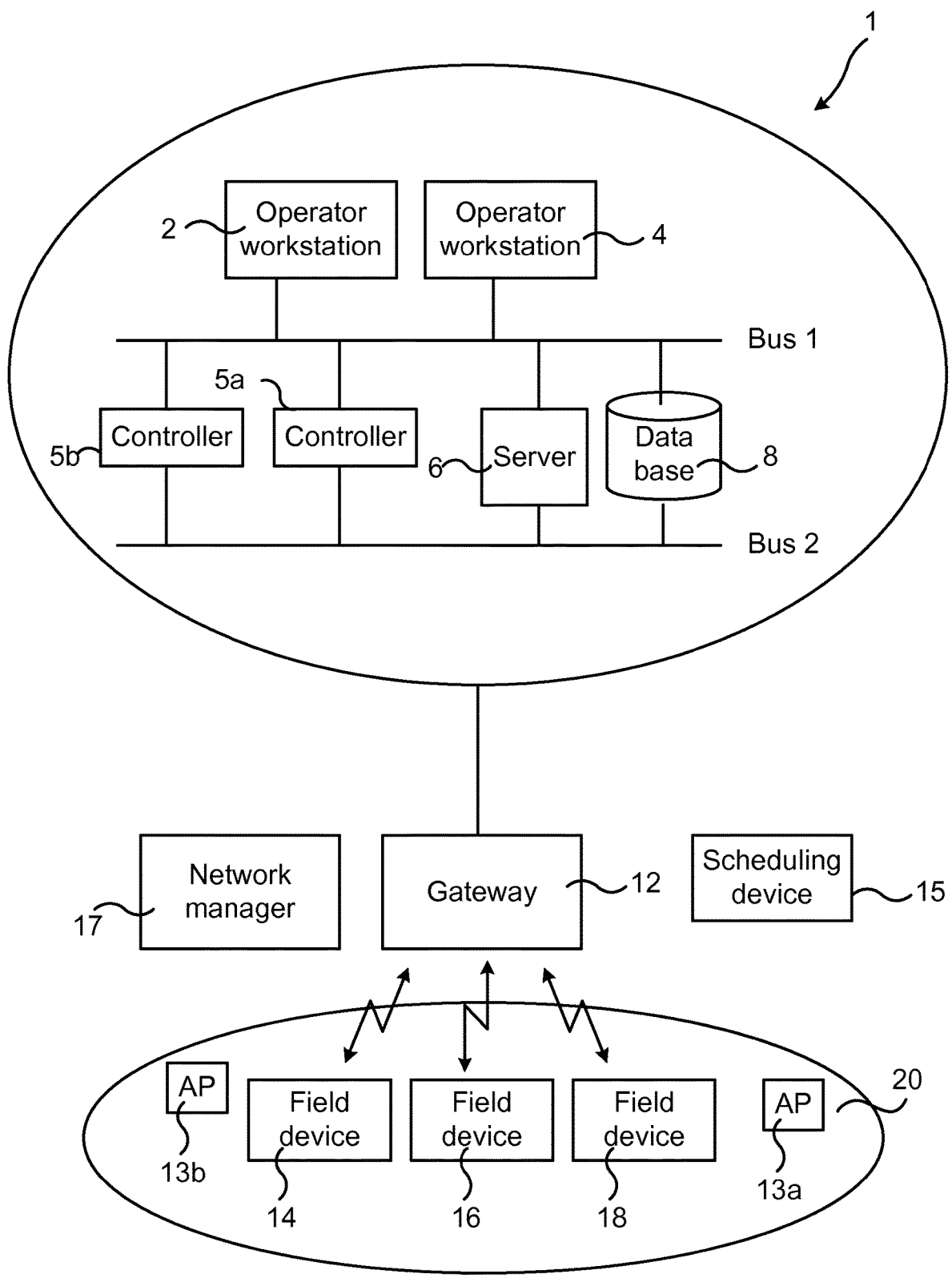
FIG. 1 illustrates an environment in which embodiments according to the present invention may be implemented.

In the following description, for purposes of explanation and not limitation, specific details are set forth such as particular architectures, interfaces, techniques, etc., in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the invention enables the creation of communication slot schedules with different period times on uplink and downlink communication flows for each device. This is in contrast to the current solutions, in which communication up and downstream use the same period time. Although the prior art solutions may facilitate the scheduling the inventors of the present invention have realized that this also severely restricts the possibilities of creating a TDMA schedule which fits the application requirements. The application requirements may differ considerably among the devices. Hence, in contrast to the prior art solution having fixed schedule lengths regardless of application cycle requirements, the method according to the present invention takes into account e.g., the different requirements of the different devices.

FIG. 1 illustrates an environment in which embodiments according to the present invention may be implemented. The environment may, for instance, be an industrial process system 1. Computer controlled process control systems are used for controlling and/or monitoring industrial processes in many different types of industries and utilities such as automotive, chemical, pharmaceutical, food, metal, mines, steel mills, consumer products, power generation, power distribution, pure and waste water handling, oil refineries, gas pipe-lines and off-shore platforms. Field devices 14, 16, 18, e.g., instruments or actuators such as motors, valves, valve positioners and sensors of different types, perform functions within the process such as driving conveyor belts, opening or closing valves, and measuring various process control parameters. Controllers perform control functions to monitor and control the field devices 14, 16, 18. Such control functions may involve receiving signals indicating process control measurements, processing the received information and generating control signals that are transmitted to the field device(s) 14, 16, 18, to control and/or monitor the operation of the process. The field devices 14, 16, 18, may thus be of many different types and may have very different requirements. A first field device may run an application requiring frequent uplink transmission and downlink transmission, while a second field device only occasionally needs to report e.g., a measurement value (i.e., only has an uplink).

In an industrial process system 1 an operator is generally able to perform desired operations with respect to a process by means of an operator workstation 2, 4 that is communicatively connected to receive process information from the field devices 14, 16, 18, and various controllers 5a, 5b. The operator may for instance be able to view the current state of the process via a user interface, perform evaluations of the process and modify the operation of the process by using the operator workstation 2, 4. Controllers 5a, 5b and workstations 2, 4 are generally connected via a communications network to a server 6 providing control and monitoring of the process and a database 8 where data, such as historical data relating to control and monitoring of the process is stored. Such communications network may, as in the illustrated case, comprise a first bus (Bus 1 in the figure) to which the operator workstations 2, 4 are connected and a second bus (Bus 2 in the figure). The server 6 and the database 8 are, in this case, connected between the first and second buses. The second bus may be connected to one or more gateways 12 (only one illustrated) via wired or wireless interfaces. The gateway 12 may in turn be connected to (or part of) a wireless network 20, which may be a wireless industrial network. The wireless network 20 may also comprise access points 13a, 13b interfacing the gateway 12 and providing a communication point for the field devices 14, 16, 18. Such access points 13a, 13b may, for instance, enable redundant communication paths for the gateway 12. In an embodiment, the wireless network 20 is a time division multiple access TDMA-based wireless field device network. The wireless network 20 may be a multi-hop network, i.e., the field devices 14, 16, 18, may use one, two or more hops to convey information to a destination.

Figure 2:
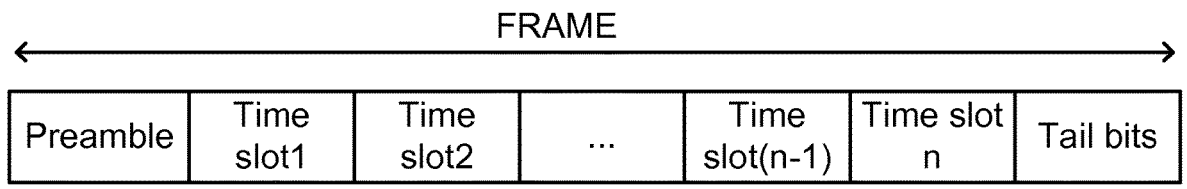
FIG. 2 illustrates an exemplary time slot structure.

FIG. 2 illustrates an exemplary time slot structure. The field devices 14, 16, 18, communicate in the wireless network 20 according to a communication structure, e.g., TDMA, which is a channel access method for wireless networks having a shared medium. The field devices 14, 16, 18, share the access to the medium in time domain. In a TDMA type of communication structure, several field devices 14, 16, 18, would share one frequency band by dividing it into different time slots. The field devices 14, 16, 18, are scheduled such that each field device 14, 16, 18, gets its own time slot(s) for receiving or transmitting data. FIG. 2 illustrates one exemplary frame (e.g., superframe) of an uplink (upstream) channel or downlink (downstream) channel. The frame comprises a number of time slots, in the illustrated case n time slots. The frame may also comprise a preamble and trail bits. Each time slot in turn may comprise a preamble (with e.g., synchronization bits), the data to be sent or received, and a guard bit. The uplink resources and/or downlink resources used by a field device 14, 16, 18, may be one or more such time slots. That is, the data that the field device 14, 16, 18, is to transmit or receive is included in one or more time slots.

A method is provided which enables the creation of communication slot schedules with different period times on uplink and downlink communication flows for each field device 14, 16, 18. This is in contrast to the current solutions, which have communication up and downstream that use the same period time. As noted earlier, this severely restricts the possibilities of creating a TDMA schedule which fits the application requirements.

Figure 3:
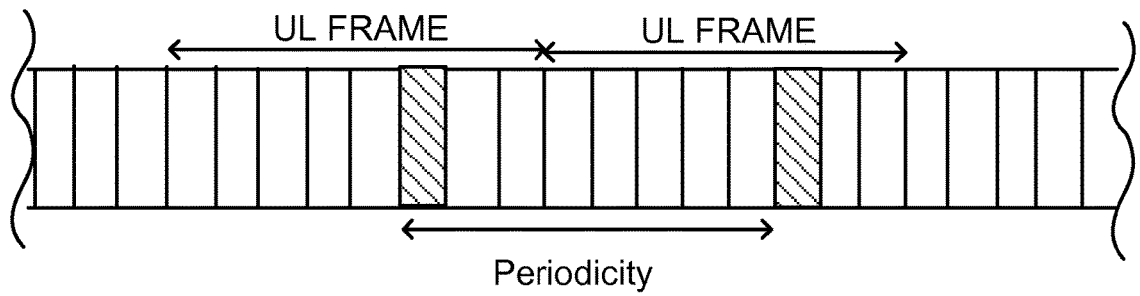
FIG. 3 illustrates different uplink and downlink periodicities for a field device.

FIG. 3 illustrates different uplink and downlink periodicities for a field device. In accordance with the invention, a field device may have a first periodicity in the uplink scheduling and a second periodicity in the downlink scheduling, wherein the first and second periodicities are different. In the upper part of FIG. 3 uplink resources are shown for a first field device 14. In this example, an uplink frame comprises eight time slots, and the periodicity is exemplified as the duration of eight time slots in this particular example. The first field device 14 is scheduled in every eighth uplink time slot, in which it sends data, e.g., a measurement value.

The periodicity can be defined as a time interval within which a field device 14, 16, 18, sends data, e.g., reports a value. The periodicity has a maximum allowable time interval within which a field device 14, 16, 18, has to send data, e.g., needs to report a value. The time period between two consecutive uplink resources on which the field device 14, 16, 18, is scheduled can hence not be longer than the maximum periodicity of the field device 14, 16, 18.

In the lower part of FIG. 3, downlink resources are shown for the same first field device 14. In this example, a downlink frame comprises eight time slots, and the periodicity is exemplified as the duration of sixteen time slot. That is, every sixteenth downlink time slot, the first field device 14 receives data, e.g., a request for data or an instruction.

In the example of FIG. 3 thus, the uplink periodicity is shorter than the downlink periodicity for the field device 14, 16, 18.

It is noted that some field devices 14, 16, 18, may have only an uplink and no downlink or only a downlink and no uplink. The periodicity may be varied also for such field devices 14, 16, 18.

The field device 14, 16, 18, may, for instance, be a small sensor and as such may not be connected to an external power source. That is, the field device 14, 16, 18, may be battery powered, and an advantage of the invention is that by adapting the periodicities in uplink and downlink according to need, the battery life-time of the field devices 14, 16, 18, may be extended.

Figure 4:
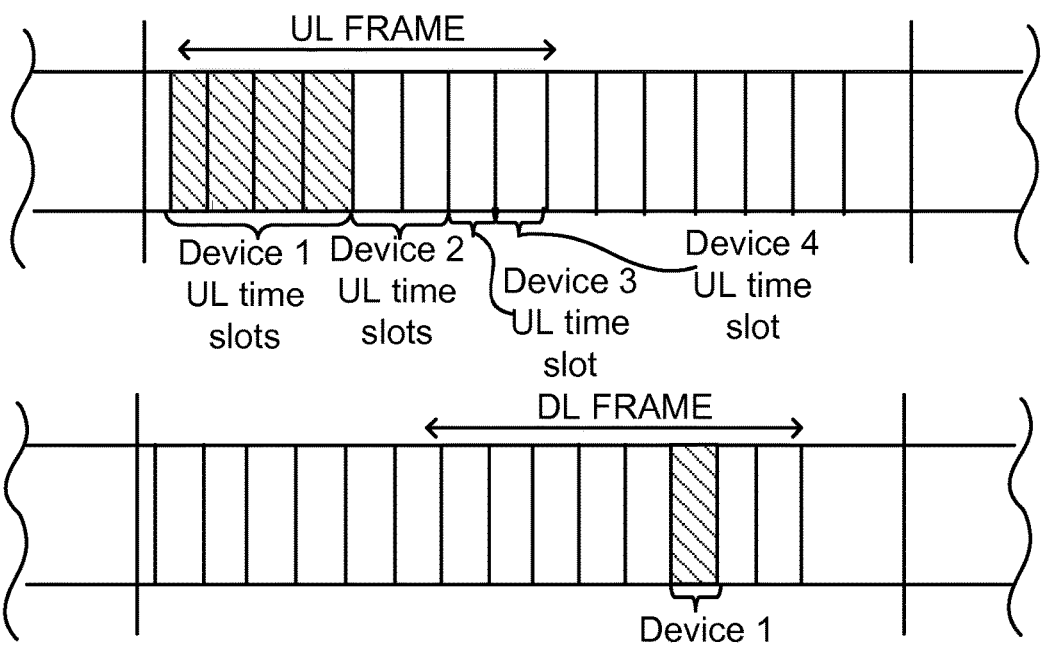
FIG. 4 illustrates an exemplary scheduling of devices.

FIG. 4 illustrates an exemplary scheduling of devices. In addition to the adaptable periodicities, also the number of resources may be adapted in view of the needs of the particular device. The upper part of FIG. 4 illustrates an uplink frame and the lower part of FIG. 4 illustrates a downlink frame. In the uplink frame a first device is scheduled to send in four consecutive time slots, a second device is scheduled to send in two consecutive time slots and a third and a fourth device are scheduled to send in a respective time slot. Depending on e.g., type of device, the number of uplink resources (time slots) on which the respective devices are scheduled varies. Further, the number of downlink resources (time slots) for each device need not be the same as the number of uplink resources, as illustrated in the lower part of FIG. 4 for the first device, which is scheduled on a single downlink resource.

By allowing adaptable periodicities, and in some embodiments also allowing adaptable number of resources, a flexibility is provided by means of which up/down-link streams can be utilized in a very efficient way. For instance, the uplink periodicity of a first field device can be prolonged or shortened such as to maximize the uplink stream utilization. When the periodicity is prolonged, it should not exceed the maximum allowed periodicity of the field device.

From a processor domain, the scheduling is viewed as a real-time scheduling problem. All communication transactions may be viewed as tasks to be scheduled, separating the up and downstream into separate disjoint tasks. This gives the possibility to assign the resources in uplink and downlink separately and in particular in dependence on the particular needs of a certain field device. With the currently used TDMA scheduling methods, the number of downlink and uplink resources are equal, irrespective of whether or not the particular device sends as much data as it receives. This means that resources are occupied by a device not needing them, for instance at the cost of another device having to wait longer, i.e., possibly unnecessarily prolonging the period time of the latter device. Although not necessarily exceeding its maximum allowed periodicity, this is still a waste of resources. In accordance with the invention, the resources are used in a more efficient way.

The direction of a task, which can also be viewed as a transaction, is determined by the field device type. There are various types of field devices. For instance, field devices having:
  only uplink, e.g., sensors,
  faster downlink than uplink, e.g., actuators,
  same period on up and downlink, e.g., devices having both sensing capabilities and actuating capabilities,
  faster uplink than downlink.

The period time of a task may be determined by the application requirements. Examples of application requirements comprise: device types, control loops, process dynamic and related time constants, end-to-end system response times and error tolerance.

The tasks may be scheduled based on real-time scheduling theory, such as, for instance, fixed priority or earliest deadline first, in order to guarantee the feasibility of the task set. For instance, in fixed priority, each task is assigned a (same) fixed priority. All tasks are periodic, but the period may be different for the different devices, and the period defines a deadline for the task. The length of time between two tasks related to a certain device is the period time of the task (equivalent to period time of the device).

The tasks may typically have a fixed computation time, which should be less than or equal to their period. Each hop in the wireless network 20 adds to this computation time of the task to be scheduled, and needs to be taken into account in the scheduling, such that e.g., deadlines and/or period times are met.

The scheduling method thus allows different devices and their application requirements to dictate the schedule. The method optimizes the useful network utilization by using individual parameters for the period of the up and downlinks (pushing it towards 100%), which in turn allows more devices to be part of the network. The individual uplink and downlink period times may be tailored (e.g., for each type of device) instead of using the same period for all devices independent of their individual requirements. This enables a more resource efficient utilization of the available resources and increases the useful utilization ratio.

The invention enables increased flexibility for wireless communication in terms of determining the communication schedule. This allows more devices to be added to the wireless network (higher utilization of bandwidth) and higher flexibility in terms of supporting varying application requirements (different up/down stream periodicities). This enables improved and in particular more efficient use of the number of gateways needed during initial deployment, upgrades or maintenance. Furthermore, it enables better tuning of the applications and processes with respect to their actual needs instead of prior art technology limitations that drive cost.

The various features and embodiments that have been described can be combined in many different ways, examples of which are given in the following, with reference first to FIG. 4.

Figure 5:
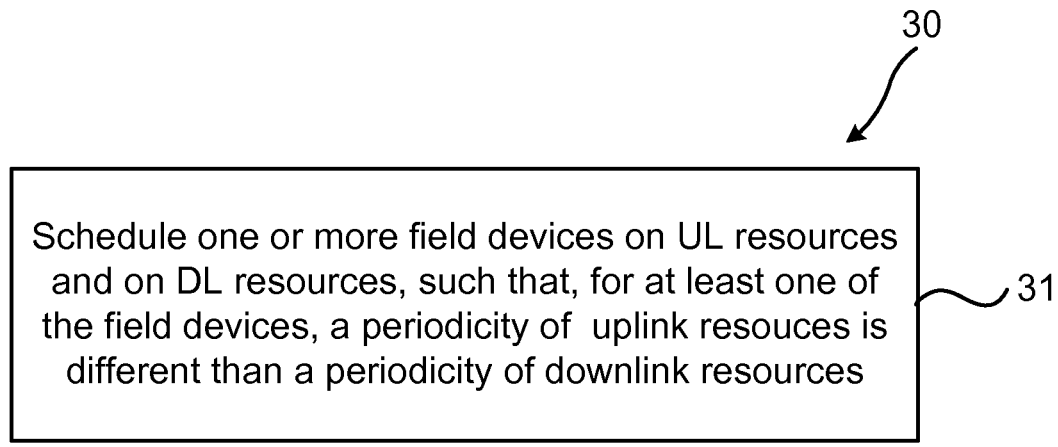
FIG. 5 illustrates a flow chart over steps of an embodiment of a method in a scheduling device in accordance with the present invention.

FIG. 5 illustrates a flow chart over steps of an embodiment of a method in a scheduling device in accordance with the present invention. The method 30 of scheduling field devices 14, 16, 18, in a wireless network 20 of an industrial process system 1 may be performed in a scheduling device 15.

The method 30 comprises scheduling 31 one or more field devices 14, 16, 18, on uplink resources and on downlink resources, such that, for at least one of the field devices 14, 16, 18, a periodicity of uplink resources is different than a periodicity of downlink resources. A field device 14, 16, 18, may have both an uplink and a downlink, or only an uplink or only a downlink.

The method 30 provides a number of advantages as have been described earlier. For instance, by allowing different uplink and/or downlink period times an increased flexibility when creating schedules is achieved. The method 30 allows different field devices (e.g., different types of field devices) and their respective application requirements to dictate the schedule. The type of device (e.g., sensor-type of device, actuator-type of device or a combination) may set the requirements on the need for an uplink and/or downlink. The period time may, for instance, be dictated by the timing requirements from machinery which the field device(s) monitors and/or actuates.

The method 30 gives more flexibility for wireless communication in terms of determining the communication schedule. By allowing the field devices to have different upstream and/or downstream period times the method also enables a higher number of devices to be added to the wireless network 20, i.e., enables a higher utilization of available bandwidth. The method 30 also gives a higher flexibility in terms of supporting varying application requirements. An improved and more efficient use of the number of gateways needed during initial deployment, upgrades or maintenance are also enabled. Furthermore, the method 30 enables improved tuning of the applications and processes with respect to their actual needs instead of technology limitations that increase costs.

In an embodiment, the scheduling 31 comprises scheduling the uplink resources and the downlink resources as independent scheduling tasks.

In some embodiments, the method 30 comprises scheduling uplink and downlink resources such that the number of uplink resources is different than the number of downlink resources for at least one of the field devices 14, 16, 18. For instance, an actuator may require a fast downlink, so that the operator can quickly control it e.g., in case of failure, and a slower uplink, which may be used only for e.g., status reporting. The actuator may therefore be scheduled on more downlink resources than uplink resources. In other instances, the device has application requirements such that a faster uplink than downlink is required. This may, for instance, be the case for sensors, which may be configured to regularly report measurement values using an uplink, while it may only occasionally receive data from e.g., a server providing updated configurations.

In a variation of the above embodiment, one of the number of uplink resources and the number of downlink resources is equal to zero. That is, a field device 14, 16, 18, may have only an uplink or only a downlink.

In another variation, none of the number of uplink resources and the number of downlink resources is equal to zero.

In various embodiments, the scheduling comprises adapting one or more of: the periodicity, number of uplink resources and number of downlink resources based on one or both of type of field device and application requirements of the field device 14, 16, 18, to be scheduled.

Figure 6:
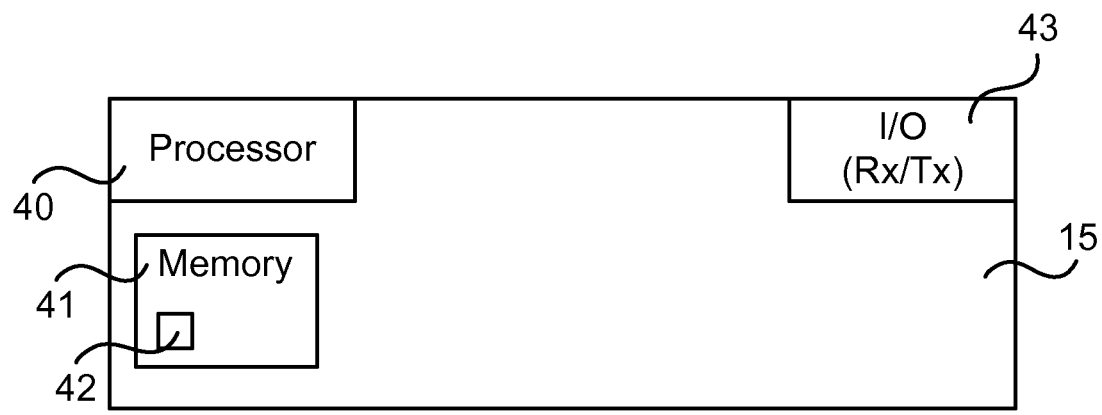
FIG. 6 illustrates schematically a scheduling device and means for implementing embodiments of the method in accordance with the present invention.

FIG. 6 illustrates schematically a scheduling device and means for implementing embodiments of the method in accordance with the present invention.

The scheduling device 15 may be a separate standalone device, or it may be an integrated part of another device or node, e.g., a network manager also responsible for e.g., managing routing tables and monitoring the wireless network 20.

The scheduling device 15 comprises a processor 40 comprising any combination of one or more of a central processing unit (CPU), multiprocessor, microcontroller, digital signal processor (DSP), application specific integrated circuit etc., capable of executing software instructions stored in a memory 41 which can thus be or form part of a computer program product. The processor 40 can be configured to execute any of the various embodiments of the method 30 for instance as described in relation to FIG. 5.

The memory 41 of the scheduling device 15 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The scheduling device 15 may comprise an interface 43 for communication with other devices and/or entities, e.g., with one or more of: other field devices 14, 16, 18, the gateway 12 and access points 13a, 13b. The interface 43 may, for instance, comprise a protocol stack, for wireless communication with other devices or entities. The interface may be used for receiving data input and for outputting data.

A scheduling device 15 is provided for scheduling field devices 14, 16, 18, in a wireless network 20 of an industrial process system 1. The scheduling device 15 is configured to schedule one or more field devices (14, 16, 18) on uplink resources and on downlink resources, such that, for at least one of the field devices (14, 16, 18), a periodicity of uplink resources is different than a periodicity of downlink resources.

The scheduling device 15 may be configured to perform the scheduling e.g., by comprising one or more processors 40 and memory 41, the memory 41 containing instructions executable by the processor 40, whereby the scheduling device 15 is operative to perform the scheduling steps.

In an embodiment, the scheduling device 15 is configured to schedule the uplink resources and the downlink resources as independent scheduling tasks.

In some embodiments, the scheduling device 15 is configured to schedule uplink and downlink resources such that the number of uplink resources is different than the number of downlink resources for at least one of the field devices 14, 16, 18.

In a variation of the above embodiment, one of the number of uplink resources and the number of downlink resources is equal to zero.

In another variation, none of the number of uplink resources and the number of downlink resources is equal to zero.

In some embodiments, the scheduling device 15 is configured to schedule by adapting one or more of: the periodicity, number of uplink resources and number of downlink resources based on one or both of type of field device and application requirements of the field device 14, 16, 18, to be scheduled.

The present invention also encompasses a computer program 42 for a scheduling device 15. The computer program 42 comprises computer program code, which, when executed on at least one processor on the network entity 20, causes the network entity 20 to perform the method 30 according to any of the described embodiments.

The present teachings also encompass computer program products 41 for a scheduling device 15 for scheduling field devices 14, 16, 18, in a wireless network 20. The computer program product 41 comprises the computer program 42 for implementing the embodiments of the methods as described, and a computer readable means on which the computer program 42 is stored. The computer program product, or the memory, thus comprises instructions executable by the processor 40. Such instructions may be comprised in a computer program, or in one or more software modules or function modules. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

In other embodiments, the scheduling device 15 comprises function modules/software modules. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described in various embodiments.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of scheduling field devices in a wireless network of an industrial process system, the method being performed in a scheduling device and being characterized by:
scheduling one or more field devices on uplink resources and on downlink resources, such that, for at least one of the field devices, a periodicity of uplink resources is different than a periodicity of downlink resources, wherein in the scheduling, the uplink and downlink are handled as separate disjoint tasks, whereby the resources are assigned separately in uplink and downlink, wherein the scheduling includes adapting one or more of: number of uplink resources and number of downlink resources based on one or both of type of field device and application requirements of the field device to be scheduled, wherein the uplink and downlink resources are time slot resources.

2. The method as claimed in claim 1, comprising scheduling uplink and downlink resources such that the number of uplink resources is different than the number of downlink resources for at least one of the field devices.

3. The method as claimed in claim 2, wherein one of the number of uplink resources and the number of downlink resources is equal to zero.

4. The method as claimed in claim 2, wherein none of the number of uplink resources and the number of downlink resources is equal to zero.

5. A computer program stored on a non-transitory computer readable medium and configured for a scheduling device, the computer program comprising a computer program code, which, when executed on at least one processor on the scheduling device causes the scheduling device to perform the method including:
scheduling one or more field devices on uplink resources and on downlink resources, such that, for at least one of the field devices, a periodicity of uplink resources is different than a periodicity of downlink resources, wherein in the scheduling, the uplink and downlink are handled as separate disjoint tasks, whereby the resources are assigned separately in uplink and downlink, wherein the scheduling includes adapting one or more of: number of uplink resources and number of downlink resources based on one or both of type of field device and application requirements of the field device to be scheduled, wherein the uplink and downlink resources are time slot resources.

6. The computer program product comprising a computer program stored on a non-transitory computer readable medium, the program including:
a computer program code, which, when executed on at least one processor of a scheduling device causes the scheduling device to perform a method including:
scheduling one or more field devices on uplink resources and on downlink resources, such that, for at least one of the field devices, a periodicity of uplink resources is different than a periodicity of downlink resources, wherein in the scheduling, the uplink and downlink are handled as separate disjoint tasks, whereby the resources are assigned separately in uplink and downlink, wherein the scheduling includes adapting one or more of: number of uplink resources and number of downlink resources based on one or both of type of field device and application requirements of the field device to be scheduled, wherein the uplink and downlink resources are time slot resources.

7. A scheduling device for scheduling field devices in a wireless network of an industrial process system, the scheduling device comprising a processor characterized by being configured to schedule one or more field devices on uplink resources and on downlink resources, such that, for at least one of the field devices, a periodicity of uplink resources is different than a periodicity of downlink resources, wherein the processor is configured to schedule the uplink and downlink resources as independent scheduling tasks, whereby the resources are assigned separately in uplink and downlink,
wherein the processor is further configured to schedule by adapting one or more of: number of uplink resources and number of downlink resources based on one or both of type of field device and application requirements of the field device to be scheduled, and
wherein the uplink and downlink resources are time slot resources.

8. The scheduling device as claimed in claim 7, wherein the processor is configured to schedule uplink and downlink resources such that the number of uplink resources is different than the number of downlink resources for at least one of the field devices.

9. The scheduling device as claimed in claim 8, wherein one of the number of uplink resources and the number of downlink resources is equal to zero.

10. The scheduling device as claimed in claim 8, wherein none of the number of uplink resources and the number of downlink resources is equal to zero.

11. The scheduling device as claimed in claim 7, wherein the field devices are instruments that control and/or monitor an industrial process.

* * * * *